March 18, 1969 — R. A. McCARTHY — 3,433,937

TIME SHARED INTEGRATION CIRCUIT

Filed Oct. 28, 1964

INVENTOR.
ROY ARTHUR McCARTHY
BY
Paul R. Harder
ATTORNEY

United States Patent Office 3,433,937
Patented Mar. 18, 1969

3,433,937
TIME SHARED INTEGRATION CIRCUIT
Roy Arthur McCarthy, Fullerton, Calif., assignor to Beckman Instruments, Inc., a corporation of California
Filed Oct. 28, 1964, Ser. No. 407,159
U.S. Cl. 235—183 8 Claims
Int. Cl. G06g 7/18; H03k 5/00

ABSTRACT OF THE DISCLOSURE

An improved multichannel circuit is disclosed wherein separate ones of a plurality of feedback capacitors are connected between the input and output of a high gain amplifier to form an integration circuit in synchronism with separate ones of multiple data signals thereby forming, for each data signal, a separate time shared integration circuit. Positive feedback is provided to compensate stray capacitance between the input and output terminals of the integrating amplifier. The positive feedback circuit includes an inverting amplifier and a capacitor. The component values of the positive feedback network are preferably chosen such that the product of the gain of the inversion amplifier and the feedback capacitor is equal to the value of the stray capacitance.

This application relates generally to integrating apparatus and more specifically to apparatus for compensating for the crosstalk in plural channel time-shared electronic integrators.

In the application of Gordon C. Blanke for Electronic Integrator, Ser. No. 407,157, filed concurrently herewith and assigned to the asignee of the instant invention there is disclosed a plural channel, time-shared integration circuit utilized in the integration and storage of multiplexed data signals. While the embodiment therein illustrated operates quite satisfactorily under certain conditions, as the frequency of the multiplexed signal train increases, crosstalk between the channels due to stray capacitance increases to an objectionable level.

It is therefore the object of this invention to provide a system for compensating for the crosstalk due to stray capacitance which occurs between channels of a multichannel integration circuit utilizing a single time-shared amplifier.

To accomplish this object a positive feedback circuit is added across the storage elements which operates to compensate for the potential stored across the stray capacitance thereby preventing interchannel crosstalk.

Figure 1:
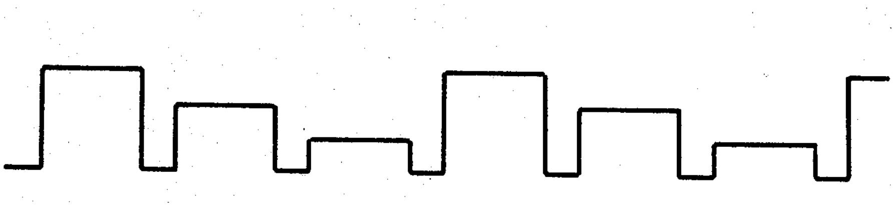
Figure 2:
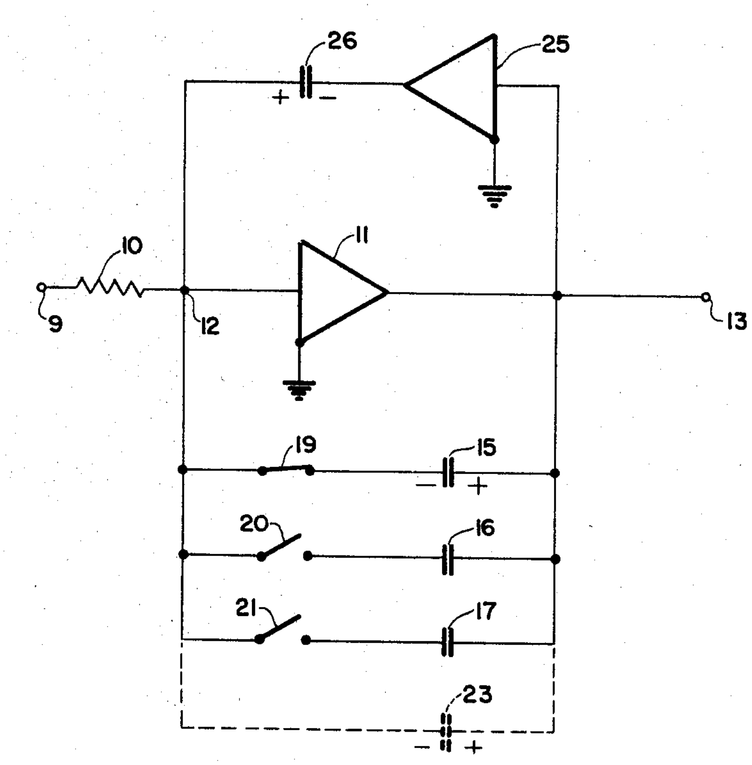

Other objects and many of the attendant advantages of this invention will become more readily apparent to those skilled in the art as the same becomes better understood by reference to the following detailed description when considered in connecting with the accompanying drawing in which:

FIG. 1 is an example of a typical input to a time-shared integration circuit; and FIG. 2 is a schematic diagram of an electrical circuit constructed according to the teachings of this invention.

The flame photometer referred to in the aforementioned application and more fully disclosed in copending application Ser. No. 407,040, filed concurrently herewith and assigned to the assignee of the instant invention, includes a rotating filter wheel containing three filters having maximum transmissions at the characteristic dominant spectral lines of three elements, for example, lithium, sodium and potassium. As the filter rotates radiant energy levels corresponding to these wavelengths impinge upon the detector periodically and sequentially with intensities dependent upon the concentration of these elements in the particular sample. The output of the detector will then be a multiplexed electrical signal having three interlaced information or data signals. One of these data signals has an amplitude that is a function of the intensity of the dominant lithium line and thereby the concentration of lithium in the sample; a second data signal has an amplitude that is a function of the intensity of the dominant sodium line and a third data signal has an amplitude that is a function of the intensity of the dominant potassium line. The sodium and potassium data signals are likewise functions of the concentration of these elements in the particular sample. With such an arrangement and with a sample having, for example, diminishing concentrations of lithium, sodium and potassium, the radiant energy signal at the detector and the output signal of the detector, if the detector is of the so called "fast detector" type, is illustrated in FIG. 1 in somewhat idealized form.

Thus, it is obvious that the multiplexed signal train which constitutes the output of the detector includes a plurality of data signals that are generated periodically and sequentially in response to a like plurality of conditions. The multiplexed signal train is passed to a multichannel time-shared integration circuit the improvement in which is illustrated in FIG. 2.

Referring to FIG. 2 the multichannel integration circuit may comprise an input terminal 9, a series resistor 10 and a high gain amplifier 11 having an input terminal 12, an output terminal 13 and a common terminal which may be connected to a point of reference potential, generally circuit ground. The output terminal 13 of amplifier 11 corresponds to the output terminal of the intergrating circuit. A plurality of storage devices, such as capacitors 15, 16 and 17, are respectively connected in negative feedback fashion by switches 19, 20 and 21 between the input and output terminals of the amplifier. This portion of the circuit, illustrated in the above mentioned application, forms a three channel, time-shared integration circuit utilizing a single-amplifier. Switches 19, 20 and 21 are utilized to demodulate or sort the mulitplexed data signals. If switches 19–21 are operated in synchronism with respective data signals representing a particular element, a distinct integration channel is formed for each of the data signals and the signal, due to a single particular condition, may be integrated over any given period of time. For example, if switch 19 is closed in synchronism with the lithium data signal while switches 20 and 21 are maintained open the lithium data signal will be integrated and stored across capacitor 15. If switch 20 is closed in synchronism with the sodium data signal, the sodium data signal will be integrated and stored across capacitor 16. Likewise, the data signal which is a function of the potassium concentration may be integrated and stored across capacitor 17 by operating switch 21 in synchronism with this signal. Thus it is apparent that the circuit so far described, and illustrated in the aforementioned application, constitutes a multichannel integrator utilizing a single time-shared amplifier.

As previously pointed out, stray capacitance which may may be caused by the wiring within the circuit or other effects may, under certain circumstances, create an undesired crosstalk between the various channels.

For example, presume that the circuit is in the condition illustrated with switch 19 closed and capacitor 15 is connected across amplifier 11. Further, let it be presumed that a potential of 20 volts having the polarity indicated has been developed across capacitor 15. Under this circumstance the instantaneous voltage at output terminal 13 will be +20 volts. The stray capacitance across the integrating channels is represented by capacitor 23 illustrated in phantom as being connected in parallel with the integrating channels. Under the assumed conditions there will also be a potential of 20 volts of the polarity indicated across this stray capacitance.

Further assume that capacitor 16 has no charge thereon and that switch 19 now opens and switch 20 closes. A portion of the charge contained on stray capacitance 23 is substantially instantaneously transferred to capacitor 16 and appears as a previously stored charge at the beginning of this particular integrating period. It is apparent that capacitor 16 also will be charged to some potential by virtue of the amplitude of the sodium data signal pulse. The total charge on this capacitor now represents not only the integrated value from the first sodium data signal pulse but also the charge transferred from the stray capacitance which was due to the previous lithium data signal pulse.

It is further apparent that the stray capacitance 23 will now be charged to a potential equal to that across capacitor 16 and, when switch 20 opens and switch 21 closes, this charge will be transferred to capacitor 17 in similar manner. As the integration proceeds over a period of time the potential on each of the capacitors is not the potential due to the integration of the separate data signals but will be dependent not only upon these signals but the charges on the other capacitors. If the integration time is sufficiently long and this switching recurs a sufficient number of times the charge across the storage capacitors 15, 16 and 17 will equalize regardless of the amplitude of the data signals on the respective channels.

It should be obvious that the amount of crosstalk is a function of the number of cycles through which switches 19, 20 and 21 are sequenced. Therefore, it is apparent that errors due to crosstalk are of insignificant consequence where the frequency of the multiplexed data signals is low or the integration period is short. However, where the frequency of the multiplexed data signals is high and the integration takes place over a relatively long period of time the crosstalk between channels reaches an intolerable level.

To overcome this difficulty there is provided a positive feedback network connected in parallel with the integrating channels and utilized to compensate the charge developed across the stray capacitance by creating a like and opposite charge in parallel therewith to neutralize the effect of the stray capacitance. The positive feedback network comprises an inverting amplifier 25 having its input connected to the output terminal of amplifier 11 and a compensating capacitor 26 connected between its output and the input terminal of amplifier 11. The component values of the positive feedback network are chosen such that the product of the gain of the amplifier 25 and the capacitance of capacitor 26 is equal to the capacitance of the stray capacitance. In this manner the compensating capacitor can be made much larger than the stray capacitance and a low gain amplifier may be used for amplifier 25.

Since 25 is an inverting amplifier the charge accumulated across capacitor 26 is in opposition to the charge accumulated on the stray capacitance. By the proper selection of components, as described hereinbefore, the charge accumualted on the positive feedback capacitor 26 will be equal and opposite to the charge accumulated on the stray capacitance for any given output potential of amplifier 11. When the integrating circuit transfers from one channel to another the charge on 26 neutralizes the charge on the stray capacitance and is then recharged to the output potential developed across the storage element of the next channel. Thus the stray capacitance charge is compensated irrespective of its value and no crosstalk between the channels occurs.

It should be noticed that the action of the stray capacity is instantaneous while, because of RC considerations, the accumulation of charge on capacitance 26 is not. Therefore, it is apparent that a speed of response requirement is placed upon the positive feedback loop and it must be constructed in such a manner as to allow the output of amplifier 25 to equilibrate prior to a change of state of the switches. This means that if the accumulated charge on capacitor 26 lags that accumulated on the storage capacitor, the various commutating switches 19–21 must remain closed after the end of the data signal pulse for a time sufficient to enable the output of amplifier 25 to reach the value of the output terminal of amplifier 11.

While in the embodiment illustrated, the inverting amplifier 25 is schematically illustrated as a separate amplifier in actual practice this amplifier constitutes one stage of high gain amplifier 11. By making compensating capacitor 26 sufficiently large the gain of amplifier 25 may be made less than unity still enabling the accumulation of a charge on capacitor 26 equal to that across the stray capacitance.

The particular type of switch utilized to connect storage capacitors 15–17 across the amplifier forms no part of this invention and may conveniently be either electronic switches or any suitable type of mechanical commutator depending upon the particular application.

While the invention has been described in detail in connection with a flame photometric system it should be understood that the multichannel integrating circuit described herein may be utilized in any instance where multiplexed data signals are to be separately integrated over a desired period of time. The data signals need not be in the form of recurrent, sequential pulses, but may be data signals recurring in any arbitrary sequence. In this case, it is only necessary to provide for suitable synchronization of the sorting switches with the recurring data signals. It is therefore, to be understood that the term multiplexed data signals as used herein is not intended to be limited to data signals which recur sequentially but may be recurrent in any arbitrary manner. It should also be understood that as used herein the term information or data signal or signals includes the absence of such signal or a zero signal level.

While the invention has been described in connection with a specific embodiment, it should be understood that the embodiment is given by way of illustration only and that many modifications and variations are possible therein in light of the foregoing teachings without departing from the spirit and scope of the invention.

What is claimed is:

1. An integrating circuit for separately integrating multiplexed data signals comprising:

amplifier means having an input and an output;

a plurality of storage means at least equal to the number of data signals;

means for periodically connecting individual ones of said plurality of storage means between said input and output of said amplifier in synchronism with respective ones of said data signals to form distinct integrating channels for each of said data signals; and positive feedback means connected across said channels for compensating stray capacitance to prevent crosstalk between said channels.

2. An integrating circuit for separately integrating and storing multiplexed data signals each a function of a variable and time sharing a single input comprising:

a plurality of storage means equal to or greater than the number of data signals;

amplifier means having an input and an output;

circuit means for connecting separate ones of said plurality of storage means between the input and output of said amplifier in an integration circuit in synchronism with respective ones of said data signals; and positive feedback means connected between the input and output of said amplifier to compensate stray capacitance across said circuit means to prevent crosstalk therebetween.

3. An integrating circuit for separately integrating multiplexed data signals generated in response to a plurality of conditions comprising:

amplifier means having an input and an output;
a plurality of storage meas at least equal to the number of data signals;
means for periodically connecting individual ones of said plurality of storage means between said input and output of said amplifier in synchronism with respective ones of said data signals to form a distinct integrating channel for each of said data signals; and
positive feedback means including storage means connected in parallel with said channels to compensate the charge on stray capacitance across said channels to prevent crosstalk therebetween.

4. An integrating circuit for separately integrating multiplexed data signals periodically and sequentially generated in response to a like plurality of conditions comprising:
amplifier means having an input and an output;
a plurality of storage means at least equal to the number of data signals;
means for periodically connecting individual ones of said plurality of storage means between said input and output of said amplifier in synchronism with respective ones of said data signals to form a distinct integrating channel for each of said data signals; and
positive feedback means including means for accumulating a charge substantially equal to but of opposite polarity to the charge accumulated across stray capacitance between the input and output of said amplifier to compensate said stray capacitance and prevent crosstalk between said channels.

5. An integrating circuit for separately integrating multiplexed data signals generated in response to a plurality of conditions comprising:
amplifier means having an input and an output;
a plurality of storage means at least equal to the number of said data signals;
means for periodically connecting individual ones of said plurality of storage means between said input and output of said amplifier in synchronism with respective ones of said data signals to form a distinct integrating channel for each of said data signals; and
positive feedback means connected between said input and output of said amplifier and including polarity inversion means and means for accumulating a charge substantially equal to that accumulated across any stray capacitance between the input and output of said amplifier.

6. An integrating circuit for separately integrating multiplexed data signals generated in response to a like plurality of conditions comprising:
amplifier means having an input and an output;
a plurality of storage means at least equal to the number of said data signals;
means for periodically connecting individual ones of said plurality of storage means between said input and output of said amplifier in synchronism with respective ones of said data signals to form a distinct integrating channel for each of said data signals;
inverting amplifier means having its input connected to the output of said amplifier means; and
capacitance means connected between the output of said inverting amplifier means and the input of said amplifier means to compensate the charge developed on any stray capacitance between the input and output of said amplifier means and prevent crosstalk between said channels.

7. An integrating circuit for separately integrating multiplexed data signals comprising:
amplifier means having an input and an output;
a plurality of storage means at least equal to the number of said data signals;
means for periodically connecting individual ones of said plurality of storage means between said input and output of said amplifier in synchronism with respective ones of said data signals to form a distinct integrating channel for each of said data signals;
inverting amplifier means having its input connected to the output of said amplifier means; and
capacitance means connected between the output of said inverting amplifier means and the input of said amplifier means, the product of said capacitance means and the gain of said inverting amplifier means being equal to any stray capacitance between the input and output of said amplifier means such that the charge accumulated on said capacitance means is equal to the charge accumulated on said stray capacitance during each period of integration.

8. An integrating circuit for separately integrating multiplexed data signals comprising:
amplifier means having an input and an output;
a plurality of storage means at least equal to the number of said data signals;
means for periodically connecting individual ones of said plurality of storage means between said input and output of said amplifier in synchronism with respective ones of said data signals to form a distinct integrating channel for each of said data signals; and
means connected between said input and output of said amplifier means and accumulating a charge equal and opposite to the charge on any stray capacitance between the input and output of said amplifier means during each period of integration thereby compensating the charge developed on said stray capacitance means.

References Cited

UNITED STATES PATENTS

| | | | |
|---|---|---|---|
| 3,047,808 | 7/1962 | Gray | 235—183 X |
| 3,079,086 | 2/1963 | Galli et al. | 235—193 |
| 3,153,202 | 10/1964 | Woolam | 330—9 |
| 3,231,728 | 1/1966 | Kusto | 235—183 |

FOREIGN PATENTS 981,149 1/1965 Great Britain.

MALCOLM A. MORRISON, *Primary Examiner.*

FELIX D. GRUBER, *Assistant Examiner.*

U.S. Cl. X.R.

328—127; 307—229; 330—85, 103, 151